United States Patent
St. Pierre et al.

(10) Patent No.: US 12,041,095 B2
(45) Date of Patent: *Jul. 16, 2024

(54) SYSTEM AND METHOD FOR DNS MISUSE DETECTION

(71) Applicant: Arbor Networks, Inc., Westford, MA (US)

(72) Inventors: Brian St. Pierre, Acworth, NH (US); Sean O'Hara, Saline, MI (US); Edmund J. Gurney, III, Canton, MI (US)

(73) Assignee: ARBOR NETWORKS, INC., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,227

(22) Filed: Jul. 14, 2023

(65) Prior Publication Data

US 2023/0362207 A1 Nov. 9, 2023

Related U.S. Application Data

(63) Continuation of application No. 17/528,917, filed on Nov. 17, 2021, now Pat. No. 11,743,301.

(51) Int. Cl.
*H04L 9/40* (2022.01)
*H04L 61/4511* (2022.01)

(52) U.S. Cl.
CPC .......... *H04L 63/30* (2013.01); *H04L 61/4511* (2022.05); *H04L 63/0254* (2013.01); *H04L 63/20* (2013.01)

(58) Field of Classification Search
CPC . H04L 63/20; H04L 61/4511; H04L 63/0254; H04L 63/302; H04L 63/30
See application file for complete search history.

(56) References Cited

U.S. PATENT DOCUMENTS

| | | | | |
|---|---|---|---|---|
| 9,306,969 | B2 * | 4/2016 | Dagon | H04L 63/1491 |
| 9,516,058 | B2 * | 12/2016 | Antonakakis | H04L 61/4511 |
| 9,661,002 | B2 * | 5/2017 | Kaminsky | H04L 61/4511 |
| 9,674,222 | B1 * | 6/2017 | Joffe | H04L 63/1408 |
| 10,044,748 | B2 * | 8/2018 | Dagon | G06F 16/951 |
| 10,924,456 | B1 * | 2/2021 | Moore | H04L 63/0281 |
| 11,743,301 | B2 * | 8/2023 | St. Pierre | H04L 63/1425 726/3 |

(Continued)

*Primary Examiner* — Hosuk Song
(74) *Attorney, Agent, or Firm* — Foley & Lardner LLP

(57) ABSTRACT

A computer method and system for mitigating Domain Name System (DNS) misuse using a probabilistic data structure, such as a cuckoo filter. Intercepted is network traffic flowing from one or more external hosts to a computer network, the intercepted network traffic including a DNS request that requests a Resource Record name in a DNS zone file. A determination is made as to whether the DNS request is requesting resolution at a protected DNS Name Server. A hash value is calculated for the requested Resource Record name if it is determined the DNS request is requesting resolution at the protected DNS Name Server. A determination is then made as to whether the calculated hash value for the requested Resource Record name is present in the probabilistic data structure. The DNS request is forwarded to the protected server if the requested Resource Record name is determined present in the probabilistic data structure.

20 Claims, 3 Drawing Sheets

(56) References Cited

U.S. PATENT DOCUMENTS 11,750,363 B2 * 9/2023 Cebere ................. H04L 9/3213
                                                         713/159
11,855,966 B2 * 12/2023 Moore ................ H04L 61/4511

* cited by examiner

SYSTEM AND METHOD FOR DNS MISUSE DETECTION

CROSS-REFERENCE TO RELATED PATENT APPLICATIONS

This application claims the benefit of priority as a continuation of U.S. application Ser. No. 17/528,917, filed Nov. 17, 2021, incorporated herein by reference in its entirety.

FIELD OF THE INVENTION

The present technology relates to detection of domain name system (DNS) misuse, and more particularly to DNS misuse detection through use of a probabilistic data structure.

BACKGROUND

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by DNS misuse. Some examples of domain name system (DNS) misuse that make use of highly variable name lookups include pseudorandom label attacks, DNS data exfiltration, and DNS tunneling. In these examples of DNS misuse, DNS requests use highly variable values for names queried in the requests.

It is to be understood the DNS namespace is divided into DNS zones. For instance, "example.com" may be a zone which contains the names www, mail, and testing. DNS clients send query messages to servers requesting the translation of names to addresses. A class of denial of service (DoS) attacks called "DNS Water Torture" occurs when one or many clients perform many malicious queries for randomized names in a specific DNS zone. These names do not exist, but the server has to spend resources checking its name database and responding with an error message. Such attacks can consume so many resources that legitimate queries go unanswered.

Prior solutions for such DNS water torture attacks failed to adequately address the problem for two principle reasons: (1) they could not scale up to the storage required to maintain a pass-list for millions of names spread across thousands of DNS zones, and (2) due in part to the inadequate scaling, they relied on a just-in-time transfer of the names in a DNS zone. This just-in-time transfer placed extra load on an already burdened server, and may not have even been successful due to this high load.

Accordingly, such conventional methods and systems have generally been considered satisfactory for their intended purpose, thus there exist the need for an improved system and method for detecting DNS misuse that does not require the aforesaid just-in-time transfer of names in a DNS zone.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, described is computer method and system for mitigating Domain Name System (DNS) misuse using a probabilistic data structure, such as a cuckoo filter. Intercepted is network traffic flowing from one or more external hosts to a computer network, the intercepted network traffic includes a DNS request that requests a Resource Record name in a DNS zone file. A determination is made as to whether the DNS request is requesting resolution at a protected DNS Name Server. A hash value is calculated for the requested Resource Record name if it is determined the DNS request is requesting resolution at a protected DNS Name Server. A determination is then made as to whether the calculated hash value for the requested Resource Record name is present in the probabilistic data structure. The DNS request is forwarded to the protected server if the requested Resource Record name is determined present in the probabilistic data structure.

BRIEF DESCRIPTION OF THE DRAWINGS

The accompanying appendices and/or drawings illustrate various non-limiting, example, inventive aspects in accordance with the present disclosure.

DETAILED DESCRIPTION

Figure 1:
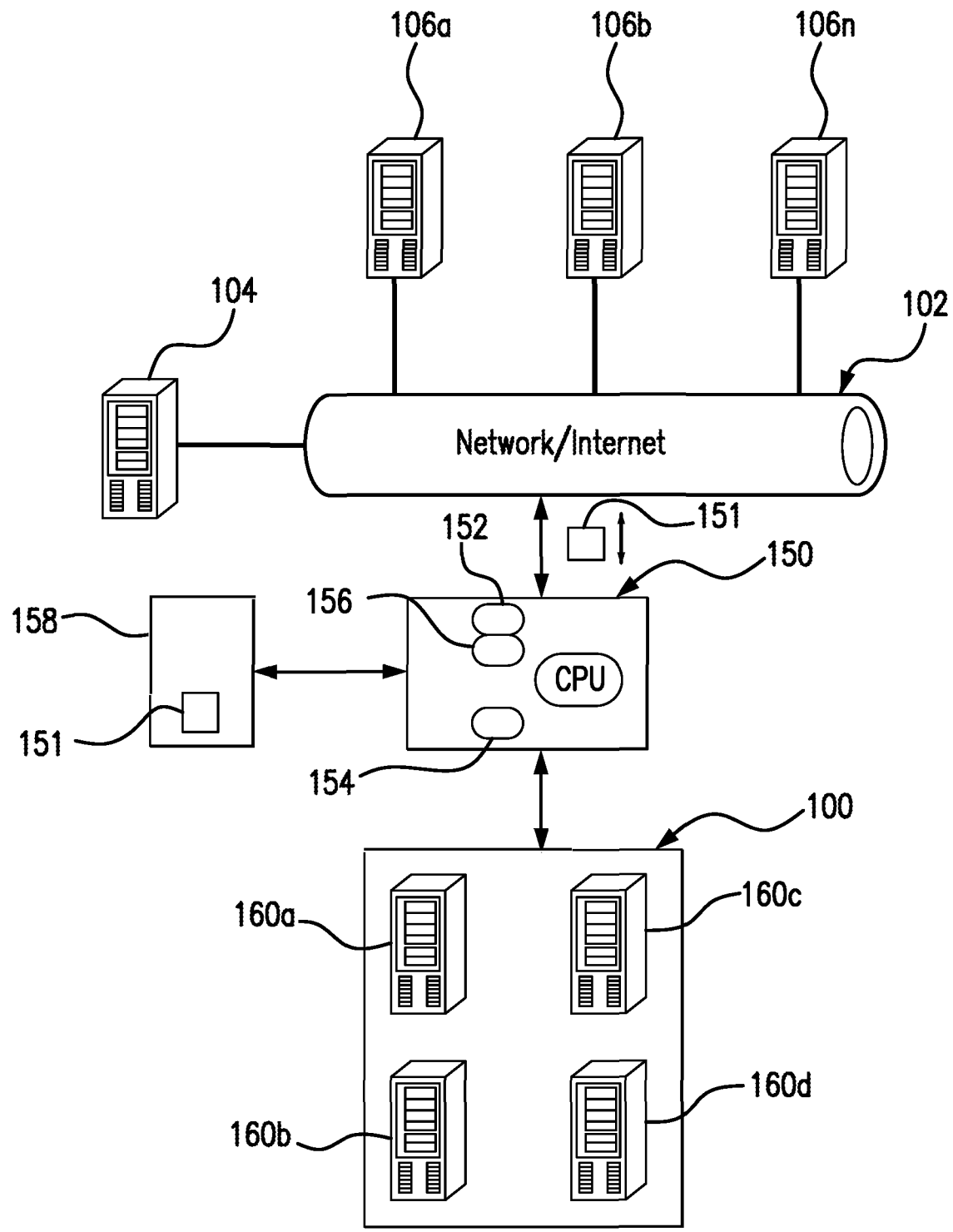
FIG. 1 is a system level diagram of a DNS mitigation misuse device in accordance with the illustrated embodiments.

The illustrated embodiments are now described more fully with reference to the accompanying drawings, in which certain illustrated embodiments are shown. The illustrated embodiments are not limited in any way as to what is shown as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the illustrated embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which the illustrated embodiments belong. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the illustrated embodiments are not to be limited by what has been particularly shown and described, except as indicated by the appended claims.

The present embodiments relate to a method and system to identify and defend against DNS misuse attacks, such as DNS Water Torture Attacks. In particular, the illustrated embodiments describe a DNS Misuse Protection System 150 and method configured and operable to mitigate against the occurrence of a DNS Water Torture Attack by utilizing name pass-lists that are preferably obtained from Authoritative Name Servers 100, which lists are actively updated preferably via a DNS Management Device 150.

It is to be appreciated and as understood by one skilled in the art, the Domain Name System (DNS) is essentially the phonebook of the Internet. Humans access information online through domain names, like nytimes.com or espn.com. Web browsers interact through Internet Protocol (IP) addresses. DNS translates domain names to IP addresses so browsers can load Internet resources. Each device connected to the Internet typically has a unique IP address which other machines use to find the device. DNS servers eliminate the need for humans to memorize IP addresses such as 192.168.1.1 (in IPv4), or more complex newer alphanumeric IP addresses such as 2400:cb00:2048:1::c629:d7a2 (in IPv6).

The process of DNS resolution involves converting a hostname (such as www.example.com) into a computer-friendly IP address (such as 192.168.1.1). An IP address is given to each device on the Internet, and that address is necessary to find the appropriate Internet device—like a street address is used to find a particular home. When a user wants to load a webpage, a translation must occur between what a user types into their web browser (example.com) and the machine-friendly address necessary to locate the example.com webpage.

The process for implementing DNS resolution for loading a webpage involves four principle components. (A) DNS recursor is a server designed to receive queries from client machines through applications such as web browsers. Typically the recursor is then responsible for making additional requests in order to satisfy the client's DNS query. The recursive resolver is the computer that responds to a recursive request from a client and takes the time to track down the DNS record. It does this by making a series of requests until it reaches the authoritative DNS name server for the requested record (or times out or returns an error if no record is found). It is to be appreciated that DNS resolvers do not always need to make multiple requests in order to track down the records needed to respond to a client; caching is a data persistence process that helps short-circuit the necessary requests by serving the requested resource record earlier in the DNS lookup. The DNS recursive resolver is the first stop in the DNS lookup, and it is responsible for dealing with the client that made the initial request. The resolver starts the sequence of queries that ultimately leads to a URL being translated into the necessary IP address. (B) The root name server is typically the first step in translating (resolving) human readable host names into IP addresses as it typically serves as a reference to other more specific locations. (C) The top level domain server (TLD) is the next step in the search for a specific IP address, and it hosts the last portion of a hostname (In example.com, the TLD server is "com"). And finally (D) the Authoritative Names Server (100) is the last stop in the nameserver query. If the authoritative name server has access to the requested record, it will return the IP address for the requested hostname back to the DNS Recursor that made the initial request. The Authoritative DNS Name Server is a server that actually holds, and is responsible for, DNS resource records. This is the server at the bottom of the DNS lookup chain that will respond with the queried resource record, ultimately allowing the web browser making the request to reach the IP address needed to access a website or other web resources. An Authoritative Name Server can satisfy queries from its own data without needing to query another source, as it is the final source of truth for certain DNS records.

In use, it is to be appreciated that there are typically principal eight steps performed regarding a DNS lookup process. (1) A user types 'example.com' into a web browser and the query travels into the Internet and is received by a DNS recursive resolver. (2) The resolver then queries a DNS root nameserver (.). (3) The root server then responds to the resolver with the address of a Top Level Domain (TLD) DNS server (such as .com or .net), which stores the information for its domains. When searching for example.com, the request is pointed toward the .com TLD. (4) The resolver then makes a request to the .com TLD. (5) The TLD server then responds with the IP address of the domain's nameserver, example.com. (6) The recursive resolver sends a query to the domain's nameserver. (7) The IP address for example.com is then returned to the resolver from the nameserver. And (8) the DNS resolver then responds to the web browser with the IP address of the domain requested initially. Once the 8 steps of the DNS lookup have returned the IP address for example.com, the browser is able to make the request for the web page: (9) The browser makes a HTTP request to the IP address; and (10) the server at that IP returns the webpage to be rendered in the browser.

It is to be appreciated that a typical uncached DNS lookup will involve both recursive and iterative queries. It is to be further appreciated that once a resolver knows the Authoritative Name Server for a domain, it can forward queries without involving the Root Name Server or TLD Name Server by using cached data, which typically remains valid for a time specified in each DNS record. Thus, it is to be appreciated that once a attacker (e.g., external host devices 106a-n) determines the address of an Authoritative Name Server, the attacker can send queries directly (a DNS misuse attack) directly to the Authoritative Name Server without involving the DNS Recursive Resolver or other DNS name servers.

Turning now descriptively to the drawings in accordance with the illustrated embodiments, in which similar reference characters denote similar elements throughout the several views, FIG. 1 illustrates a generalized monitoring/detection system for implementing mitigation of DNS misuse attacks such as DNS water torture attacks. The exemplary embodiment of FIG. 1 depicts the relationship between one or more protected Authoritative Name Servers 100, the DNS Misuse Protection System 150, Internet 102, and external host devices 106a-106n.

It is to be appreciated that in accordance with an illustrated embodiment, the protection system 150 is configured and operable to operate as a detection and mitigation device for preventing a denial of service attack, such as DNS misuse attacks (e.g., DNS water torture attacks) on targeted protected Authoritative Name Servers 100.

In a typical implementation, the external host devices 106a-106n (also referred to as external devices or host devices) attempt to connect to the one or more protected Authoritative Name Servers 100 typically via a private network or a public computer network such as the Internet 102. Examples of external host devices include servers, laptops and desktop computers and other similar devices and systems having Internet connectivity. In a preferred embodiment, the protected one or more Authoritative Name Servers 100 are protected by a protection system 150 preferably located between the Internet 102 and the one or more Authoritative Name Servers 100. In other embodiments, the protection system 150 is located within the Internet, service provider network or enterprise network rather than as a network edge as illustrated.

The protection system 150 preferably includes a packet processing system preferably having an external high speed network interface 152 and a protected high-speed network interface 156. Typically, these interfaces are capable of handling 1-100 Gbps, for example. As described herein, the protection system 150 also includes a probabilistic data structure 154 configured and operable for mitigation of DNS misuse attacks as to be described herein in accordance with the illustrated embodiments. Computer code is preferably stored in protection system 150 and executed by the CPU of protection system 150.

In accordance with the illustrated embodiments, coupled to, or integrated with the protection system is a DNS name management device 158 for periodically updating the protection system 150, and particularly the probabilistic data structure 154, as to be described herein. In particular, and in accordance with the certain illustrated embodiments, the protection system 150 preferably includes (preferably via a management device 158) the DNS names, for all of the DNS zones a protected Authoritative Name Server 100 is responsible for. Preferably the DNS protection system 150 is actively updated throughout the mitigation period, preferably via the DNS Management Device 158 coupled to the protection system 150. As described herein, this is preferably accomplished through the use of a probabilistic data structure 154, preferably consisting of a cuckoo filter. It is to be understood a cuckoo filter 154 is a space-efficient probabilistic data structure that is used to test whether an element is a member of a set, like a Bloom filter does. False positive matches are possible, but false negatives are not—in other words, a query returns either "possibly in set" or "definitely not in set". A cuckoo filter 154 can also delete existing items, which is not supported by Bloom filters. In addition, for applications that store many items and target moderately low false positive rates, cuckoo filters can achieve lower space overhead in comparison to space-optimized Bloom filters. That is, a cuckoo filter 154 is a data structure in which hashes of data can be stored, and membership in the data structure can be checked with a known and controllable false positive probability, and a zero false negative probability. Using these properties of cuckoo filters, a high volume of DNS names (e.g., in the order of 10^10 names (billions)) can be stored using only a normal memory capacity of standard modern servers. It is additionally to be understood the time required to perform a lookup in a cuckoo filter 154 is independent of the number of entries (e.g., it is as fast when there are a billion entries as when there is just one). It is thus to be appreciated that storing all these DNS names in a cuckoo filter 154 removes the requirement from the aforementioned prior art solution for just-in-time transfer. Hence, by using a cuckoo filter 154, the transfer of the names can be arranged prior to any DNS misuse attack such that the protection system 150 is staged and ready.

It is to be appreciated that because DNS zones change, and because large service providers may add or remove DNS zones from their servers, it is advantageous for the protection system 150 to receive updates to both the set of DNS zones and the DNS names within those DNS zones. Prior to describing how DNS zones are updated in the protection system 150, it is to be understood that a DNS is broken up into many different zones. These zones differentiate between distinctly managed areas in the DNS namespace. A DNS zone is a portion of the DNS namespace that is typically managed by a specific organization or administrator. A DNS zone is an administrative space which allows for more granular control of DNS components, such as Authoritative Name Servers 100. The domain name space is a hierarchical tree, with the DNS root domain at the top. A DNS zone starts at a domain within the tree and can also extend down into subdomains so that multiple subdomains can be managed by one entity.

In accordance with the illustrated embodiments, and as described herein, the protection system 150 receives DNS zone updates in two methods, preferably via a DNS management device 158. First, the management device 158 may receive notification updates to a "catalog zone" which lists the set of DNS zones that a protected Authoritative Name Server 100 is responsible for (for instance, this DNS feature is implemented in the BIND server and is on track to become part of the DNS standard). Second, the management device 158 may receive update messages sent to an API 151 provided by the protection system 150 (for service providers that use servers other than BIND, or who otherwise do not use catalog zones). When a new DNS zone is added, the protection system 150 preferably initiates a transfer of the DNS zone and adds the DNS names in the aforesaid added DNS zone to the cuckoo filter 154.

As also described herein, the protection system 150 preferably receives DNS name updates in two methods. First, it may receive DNS NOTIFY messages that a DNS zone's contents have changed, or second, it may receive update messages sent to an API 151 preferably provided by the protection system 150. It is to be understood that when a DNS zone is updated and the specific name-change is not provided in the message, the protection system 150 is preferably configured and operable to perform an incremental transfer which saves load and bandwidth on the protected Authoritative Name Server 100. For instance, if the name is provided in the update message, then the protection system 150 adds it to the cuckoo filter 154. And in the event a DNS name or an entire DNS zone are removed, then the protection system 150 removes either the single DNS name, or all the DNS names in the DNS zone, respectively, from the cuckoo filter 154.

In accordance with the illustrated embodiments, during a DNS misuse attack (e.g., a DNS Water Torture Attack), the protection system 150 is configured and operable to inspect all queries sent from external devices 106 to one or more protected Authoritative Name Servers 100. It is to be appreciated that for each name queried, the protection system 150 checks the cuckoo filter 154, with two possible results: "probably present" and "definitely not present". In the case where the name is not present, the protection system 150 drops the query. And in the scenario where the DNS name is probably present, the protection system 150 forwards the query to a protected Authoritative Name Server 100. It is to be understood that the probability of forwarding a malicious DNS query is tunable but is on the order of 3%, which is sufficient to avoid causing disruption to the protected Authoritative Name Servers 100.

Figure 2:
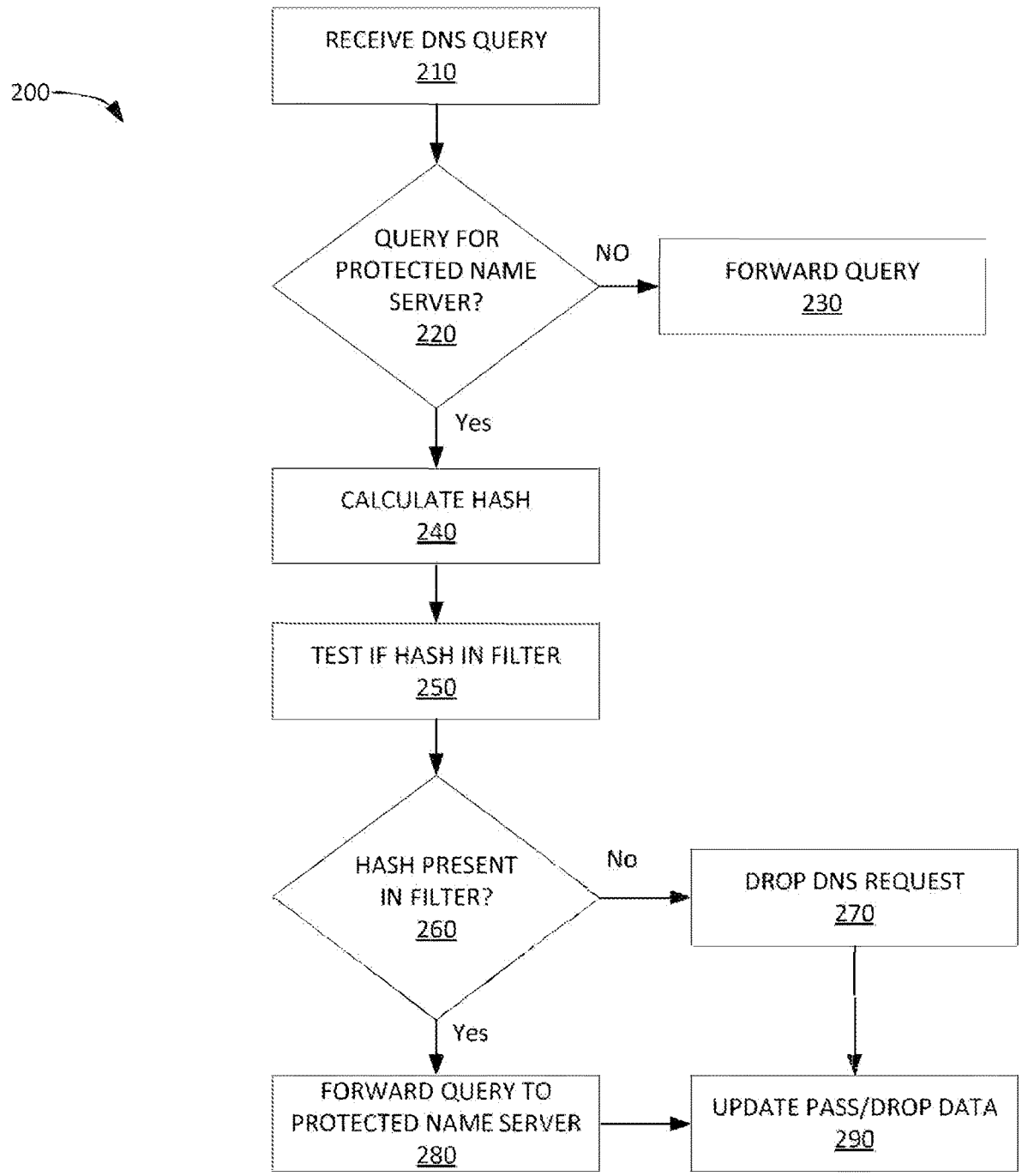
FIGS. 2 and 3 are flowcharts depicting certain operational steps performed in accordance with certain illustrative embodiments.

With a description of a protection system 150 suitable for use with the illustrated embodiments being described above with reference to FIG. 1, and with continuing reference to FIG. 1, the process for mitigating DNS misuse attacks will now be described in accordance with the illustrated embodiments designated generally by reference numeral 200 in FIG. 2. The foregoing description should therefore be considered as merely illustrative of the principles, teachings and exemplary embodiments of the illustrated embodiments, and not in limitation thereof. It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

Starting at step 210, network traffic 151, is intercepted by the protection device 150, flowing from one or more external hosts 106 to a DNS Authoritative Name Server 100 (e.g., using cached data) seeking DNS name resolution requesting a Resource Record name resident in a particular DNS zone file. Next, at step 220 the intercepted DNS name request is inspected by the protection device 250 to determine if the DNS request (requested Resource Record (RR) name) is requesting resolution at one or more protected DNS Name Servers 100. If no, the DNS name request is preferably forwarded to a DNS Recursive Resolver or DNS Authoritative Name Server that is not protected by the protection device 150, step 230. If yes, the intercepted DNS request is requesting resolution at one or more protected DNS Name Servers 100, then the protection device 150 preferably calculates a hash value for this DNS request preferably using a predetermined algorithmic technique, STEP 240. Next, preferably with lookup reference to the hash values stored in the cuckoo probabilistic data filter 154 associated with the protection device 150, a determination is made as to whether the calculated hash value for the requested DNS RR name (step 240) is present in the cuckoo probabilistic data filter 154, step 250. As described further below with particular reference to FIG. 3, the cuckoo filter 154 is preferably updated, via a DNS name management device 158, with a listing of valid DNS RR names a DNS Authoritative Name Server 100 is responsible for that the protection device 150 is configured and operable to protect against DNS name misuse attacks.

If no, the calculated hash value for the requested DNS RR name (step 240, 250) is not present in the cuckoo probabilistic data filter 154 (step 260), then one or more mitigation techniques is preferably performed on the requested DNS RR name query, which may include dropping requested DNS RR name, step 270. And if yes, the requested DNS RR name (step 240, 250) is present (via a matching hash value) in the cuckoo probabilistic data filter 154 (step 260), then the DNS RR request is forwarded to the protected DNS Authoritative Name Server 100 since it has been authenticated as being a valid DNS RR request via its presence in the cuckoo probabilistic data structure.

Figure 3:
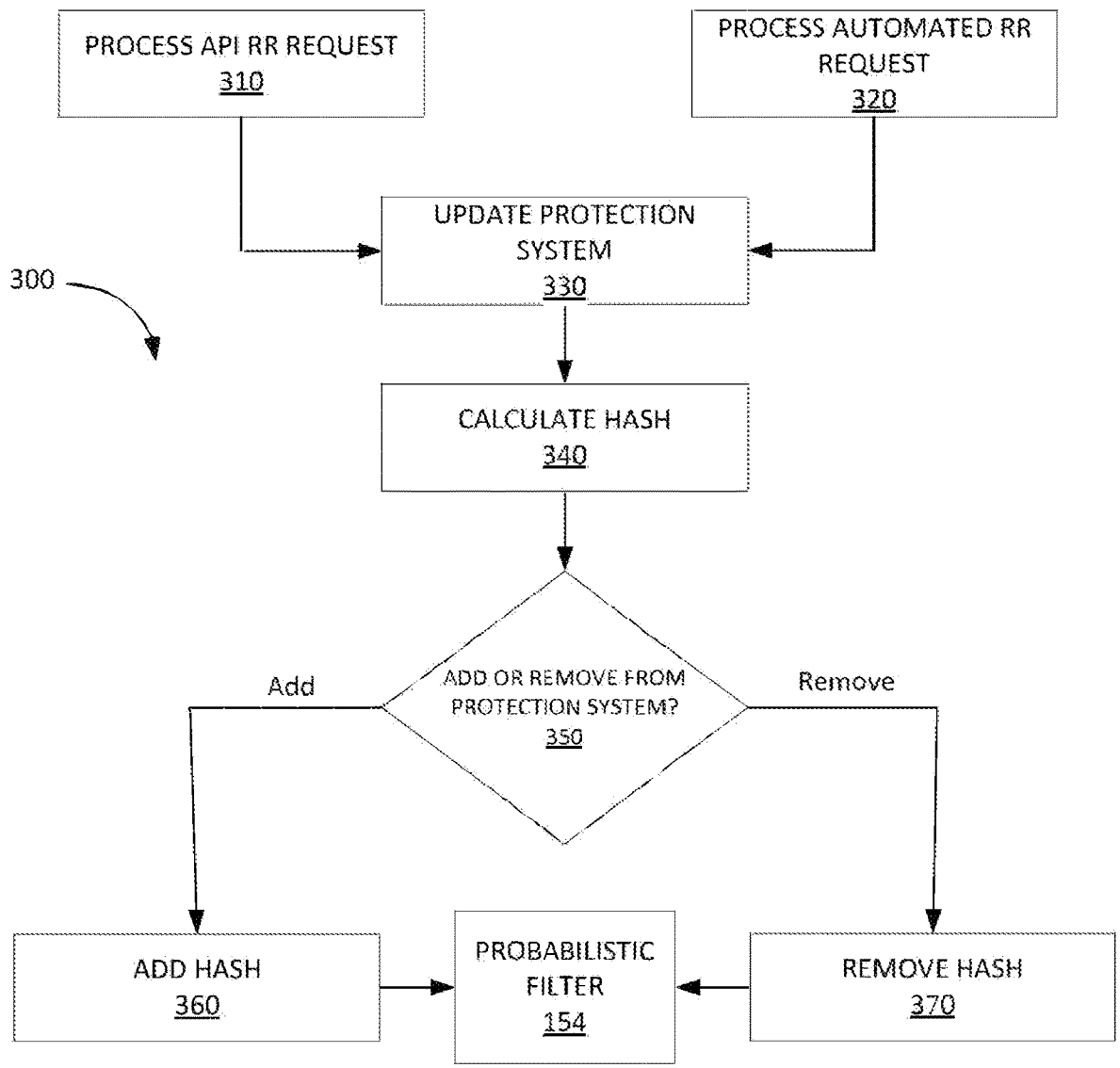

With reference now to FIG. 3, the process 300 for updating the DNS name management device 158 with DNS names and/or DNS zones will now be described. The management device 158 may receive an update request via an API request (e.g., from cached data from protection device 150) (e.g., for service providers that use servers other than BIND, or who otherwise do not use catalog zones) to add or remove RR data, step 310. The management device 158 may also process automated RR data from certain servers (step 320), including (but not limited to) Zone Catalogs, AXFRs, INOTIFY message and the like. Next, step 330, the process for transferring the RR names (acquired from steps 310 and 320) to the protection device 150 is initiated in which RR names are either added or removed from the cuckoo filter 154, as described herein.

Upon receipt the of the RR names from step 330, the protection device 150 then preferably calculates a hash value for each RR names to be either added or removed from the cuckoo filter 154, step 340. A determination is then made as to whether the hash value calculated for each RR name is to be either added or removed from the cuckoo filter 154 (step 350). If an RR name is to be added, then this is indicative that either the Protected Name Server 100 is now responsible for a new DNS zone, or a new DNS RR is be added to a DNS zone the Protected Name Server 150 is already responsible for. And if an RR name is to be removed from the cuckoo filter 154 (step 370), then this is indicative that either the Protected Name Server 100 is no longer responsible for a DNS zone it was responsible for, or a DNS RR is be removed from a DNS zone the Protected Name Server 150 is already responsible for.

If a DNS RR is to be added, then the calculated hash value (step 340) for the DNS is inserted into the cuckoo filter 154, step 360. And if a DNS RR is to be removed, then the calculated hash value (step 370) for the DNS is removed from the cuckoo filter 154, step 370.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method for mitigating Domain Name System (DNS) misuse using a probabilistic data structure, the method comprising:
   intercepting network traffic flowing from one or more external hosts to a computer network, the intercepted network traffic including a DNS request that requests a resource record name in a DNS zone;

if the DNS request is requesting resolution at a protected DNS name server, calculating a hash value for the requested resource record name; and if the calculated hash value for the requested resource record name is present in the probabilistic data structure, forwarding the DNS request to the protected server.

2. The method of claim 1, further comprising performing a mitigation action on the DNS request if it is determined the calculated hash value for the requested resource record name is not present in the probabilistic data structure.

3. The method of claim 1, wherein the probabilistic data structure includes a cuckoo filter.

4. The method of claim 1, wherein the protected DNS name server is an authoritative name server.

5. The method of claim 1, further comprising forwarding the DNS request to another DNS name server if the DNS request is determined not to be requesting resolution at the protected DNS name server.

6. The method of claim 1, further comprising periodically updating the probabilistic data structure which includes adding hash values to the probabilistic data structure associated with new resource record names.

7. The method of claim 6, further comprising deleting hash values from the probabilistic data structure associated with resource record names preexisting in the probabilistic data structure.

8. The method of claim 7, wherein periodically updating the probabilistic data structure is initiated upon an application program interface (API) request for adding, deleting, or updating one or more DNS zones.

9. The method of claim 7, wherein periodically updating the probabilistic data structure is initiated upon receipt of a notification to update a catalog zone that lists a set of DNS zones.

10. The method of claim 6, wherein adding hash values to the probabilistic data structure and/or deleting hash values from the probabilistic data structure includes determining hash values for resource record names to be added and/or deleted from the probabilistic data structure.

11. The method of claim 10, wherein the resource record names to be added and/or deleted from the probabilistic data structure are associated with one or more DNS zones.

12. A non-transitory computer-readable media comprising computer- executable instructions embodied thereon that, when executed by a processor, cause the processor to perform a process for mitigating Domain Name System (DNS) misuse using a probabilistic data structure, the process comprising:

intercept network traffic flowing from one or more external hosts to a computer network, the intercepted network traffic including a DNS request that requests a resource record name in a DNS zone;

if the DNS request is requesting resolution at a protected DNS name server, calculate a hash value for the requested resource record name; and if the calculated hash value for the requested resource record name is present in the probabilistic data structure, forward the DNS request to the protected server.

13. The non-transitory computer-readable media of claim 12, wherein the processor is further configured to perform one or more mitigation actions on the DNS request if it is determined the calculated hash value for the requested resource record name is not present in the probabilistic data structure.

14. The non-transitory computer-readable media of claim 12, wherein the probabilistic data structure includes a cuckoo filter.

15. The non-transitory computer-readable media of claim 12, wherein the protected DNS name server is an Authoritative Name Server.

16. The non-transitory computer-readable media of claim 12, wherein the processor is further configured to forward the DNS request to another DNS name server if the DNS request is determined not to be requesting resolution at the protected DNS Name Server.

17. The non-transitory computer-readable media of claim 12, wherein the processor is further configured to periodically update the probabilistic data structure which includes adding hash values to the probabilistic data structure associated with new resource record names, and/or deleting hash values from the probabilistic data structure associated with resource record names preexisting in the probabilistic data structure.

18. The non-transitory computer-readable media of claim 17, wherein periodically updating the probabilistic data structure is initiated upon an application program interface (API) request for adding and/or deleting and/or updating one or more DNS zones.

19. The non-transitory computer-readable media of claim 17, wherein periodically updating the probabilistic data structure is initiated upon receipt of a notification to update a catalog zone that lists a set of DNS zones.

20. The non-transitory computer-readable media of claim 13, wherein adding hash values to the probabilistic data structure and/or deleting hash values from the probabilistic data structure includes determining hash values for resource record names to be added and/or deleted from the probabilistic data structure, and wherein the resource record names to be added and/or deleted from the probabilistic data structure are associated with one or more DNS zones.

* * * * *